United States Patent [19]

Zaid

[11] Patent Number: 5,936,059
[45] Date of Patent: Aug. 10, 1999

[54] EPOXY CORROSION INHIBITION SYSTEMS INCLUDING ETHOXYLATED CURING AGENTS

[75] Inventor: Gene H. Zaid, Sterling, Kans.

[73] Assignee: Jacam Chemical Partners, Ltd., Sterling, Kans.

[21] Appl. No.: 08/919,943

[22] Filed: Aug. 29, 1997

[51] Int. Cl.⁶ .................................................... C08G 59/00
[52] U.S. Cl. .............................................................. 528/421
[58] Field of Search ............................................. 528/421

[56] References Cited

U.S. PATENT DOCUMENTS

| | | | |
|---|---|---|---|
| 4,022,946 | 5/1977 | Cummings | 428/413 |
| 4,526,813 | 7/1985 | Wu | 427/235 |
| 4,713,184 | 12/1987 | Zaid | 252/8.552 |

*Primary Examiner*—Erma Cameron
*Attorney, Agent, or Firm*—Hovey, Williams, Timmons & Collins

[57] ABSTRACT

Improved anti-corrosion coating systems for use in treating downhole metal surfaces in oil and gas wells are provided which include an epoxy resin together with a curing agent such as ethoxylated tallow diamine. The resin and curing agent are dispersed in an aromatic hydrocarbon dispersant, and are injected together or separately into a production well in order to form a corrosion-resistant film on downhole metal surfaces. The coating systems are resistant to freezing and provide relatively long term corrosion protection.

17 Claims, No Drawings

EPOXY CORROSION INHIBITION SYSTEMS INCLUDING ETHOXYLATED CURING AGENTS

BACKGROUND OF THE INVENTION

1. Field of the Invention

The present invention is broadly concerned with improved anti-corrosion coating systems especially designed for use in the oil and gas industry for treatment of downhole oil and gas well metallic surfaces. More particularly, the invention pertains to such coating systems made up of an epoxy and a curing agent, the latter being selected from the group consisting of the alkoxylated amines and the imidazolines and mixtures thereof. The coating systems of the invention are resistant to freezing and do not suffer from the tendency to agglomerate or "clabber" in the presence of downhole formation water containing significant quantities of chloride ion and sulfur compounds.

2. Description of the Prior Art

It is well known that oil and gas wells are subject to extensive corrosion. Downhole equipment such as sucker rods, pump rods, tubing and casing are generally made of mild steel which is adversely affected by the production fluid of the well. The often high temperatures and acidic nature of the production fluids and formation waters magnifies these corrosion problems.

A variety of anti-corrosion systems have been described in the past. Many corrosion inhibitors are aqueous dispersions containing a variety of components, e.g., 2-mercaptobenzothiozole, benzotriozole, tolyltriozole, phosphates, polyphosphates, organic soluble polymers, silicates, dithiocarbamates, nitrites, oxazoles, imidazoles, imidazolines, lignands, lignosulfates, tannins, phosphoric acid esters and boric acid esters. Many of these inhibitors are very prone to freezing during cold weather, making them very difficult to handle and maintain. Moreover, the useful life of many prior anti-corrosion treatments is very short, e.g., a week or less.

U.S. Pat. No. 4,526,813 describes composite systems made up of an epoxy resin, an alcohol and an amine curing agent such as N-tallow-1,3-diaminopropane. The tallow diamine curing agent in aromatic solvent has a tendency to freeze in cold weather conditions, necessitating the presence of the alcohol. In addition, the alcohol tends to inhibit agglomeration or clabbering which materially detracts from the utility of the anti-corrosion film.

SUMMARY OF THE INVENTION

The present invention overcomes the problems outlined above and provides improved anti-corrosion coating systems which will not freeze even under severe winter time conditions and which give a long lasting anti-corrosive film to downhole metal surfaces in production wells. Broadly speaking, the coating systems of the invention include an epoxy resin in a first dispersant together with a compatible curing agent for the epoxy resin in a second dispersant. The curing agents are advantageously selected from the group consisting of alkoxylated amines and imidazolines and mixtures thereof, and the two components together form a corrosion-resistant coating when injected into a well. The systems of the invention are preferably essentially free of alcohol but nevertheless will not freeze at temperatures as low as −40° F.

The curing agent is preferably a $C_1$–$C_4$ alkoxylated tallow amine or diamine having from about 2–15 moles (more preferably from about 3–10 moles) of alkoxylate per mole of tallow amine or diamine. The ethoxylated tallow amines and diamines are particularly suitable for use in the invention. The curing agents are preferably dispersed in an aromatic hydrocarbon dispersant, especially those selected from the group consisting of benzene, xylene, toluene, heavy aromatic naphtha and mixtures thereof. Generally, the curing agent should be present at a level of from about 10–50% by volume in the dispersant, and more preferably from about 15–40% by volume.

A wide variety of different epoxy resin formulations can be used to good effect in the invention, particularly the commercially available resins which are reaction products of epichlorohydrin and bisphenol A. The epoxy component is likewise preferably dispersed in an aromatic hydrocarbon dispersant such as those discussed above in connection with the curing agent. Similarly, the epoxy is normally present at a level of from about 10–50% by volume in the dispersant, and more preferably from about 15–40% by volume.

In use, the coating system of the invention is injected into a well in order to cover downhole metallic surfaces. The epoxy and curing agent can be mixed at the well site and injected, or can be premixed at the factory in the case of the ethoxylated curing agents, so long as the premixed product is injected within about three days after factory preparation so as to avoid significant curing. Most conveniently, the system is injected into the well casing during normal production, and is then flushed through by injection of formation water behind the system components. It has been found that the ratio of the curing agent to the epoxy fraction as injected should be from about 1 to 4 parts by weight curing agent to each part by weight epoxy, more preferably from about 2–3 parts by weight curing agent to each part by weight epoxy. Generally, the system of the invention should be injected at a level of from about 5–100 ppm (more preferably from about 10–50 ppm) of the total anti-corrosive system, based upon the amount of total fluids produced by the well per week.

DETAILED DESCRIPTION OF THE PREFERRED EMBODIMENT

As noted above, a variety of epoxies can be used in the invention. Generally, any epoxy resin having, on the average, more than one vicinal epoxy group per molecule can be used in the composition and process of the invention. The epoxy resin may be saturated or unsaturated, aliphatic, cycloaliphatic, aromatic or heterocyclic, and may bear substituents which do not materially interfere with the curing reaction.

Suitable epoxy resins include glycidyl ethers prepared by the reaction of epichlorohydrin with a compound containing a hydroxyl group (e.g., bisphenol A) carried out under alkaline reaction conditions. Other suitable epoxy resins can be prepared by the reaction of epichlorohydrin which mononuclear di- and tri-hydroxy phenolic compounds such as resorcinol and phloroglucinol, selected polynuclear polyhydroxy phenolic compounds such as bis(p-hydroxyphenyl) methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 2000 to about 1500. The commercially available Epon 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185–192, is presently preferred.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like, with unsaturated alcohols.

In addition to the foregoing, it is contemplated that suitable polyepoxides can be derived from esters prepared from unsaturated alcohols and unsaturated carboxylic acids. Representative epoxidized esters include the following: 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododedcyl-3,4-epoxypentanoate; 3,4-epoxyoctyl-2,3-epoxycyclododecane carboxylate and the like.

Other unsaturated materials which can be epoxidized to give resins suitable for use include butadiene based polymers such as butadiene-styrene copolymers, polyesters available as derivatives of polyols such as ethylene glycol with unsaturated acid anhydrides such as maleic anhydride and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-carboxylate; dioctyl 3,4,7,8-diepoxyhexadecanedioate; diethyl 5,6,9,10-diepoxytetradecanedioate and the like.

Dimers of dienes such as 4-vinyl cyclohexene-1 from butadiene and dicyclopentadiene from cyclopentadiene can be converted to epoxidized derivatives which are suitable for use.

The alkoxylated amine curing agents useful in the invention may be aliphatic, cycloaliphatic, aromatic or heterocyclic. Particularly preferred are the alkoxylated polyamines, especially the alkoxylated N-alkyl- and N-alkylenyl- substituted 1,3-diaminopropanes and mixtures thereof. Examples of such alkoxylated polyamines include alkoxylated N-hexadecyl-1,3-diaminopropane, N-tetradecyl-1,3-diaminopropane, N-octadecyl- 1,3-diaminopropane, N-pentadecyl-1,3-diaminopropane, N-heptadecyl-1,3-diaminopropane, N-nonadecyl-1,3-diaminopropane, and N-octadecnyl-1,3-diaminopropane. Various commercially available mixtures of ethoxylated N-alkylated and N-alkenylated diamines can be used in the invention. The presently preferred polyamine is a commercial product, ethoxylated N-tallow-1,3-diaminopropane, where the degree of ethoxylation is approximately 10 moles ethoxylate per mole of tallow diamine.

Various imidazoline derivatives can be employed in the invention and the most preferred derivatives are set forth in the following structural formula:

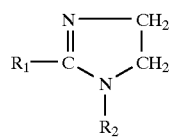

wherein $R_1$ is hydrogen or an alkyl group having up to 18 carbon atoms therein, and $R_2$ is hydrogen, or an alkyl or amine group having up to 18 carbon atoms therein.

The presently most preferred anti-corrosion coating system is made up of a 25% by volume dispersion of epoxy in heavy aromatic naphtha, and a 25% by volume dispersion of ethoxylated tallow-1,3-propylene diamine in heavy aromatic naphtha having about 10 moles of ethoxylate per mole of tallow diamine. These two components are used at a curing agent:epoxy volumetric ratio of about 3:1, which translates to about 3 parts by weight ethoxylated tallow diamine per part by weight epoxy. This preferred system is used at a level of about 20 ppm of total anti-corrosive system (i.e., the combined epoxy and ethoxylated curing agent) per total fluid produced by the well per week.

The components of the coating systems of the invention can be mixed on-site and injected into the well casing, or injected separately at the well site for downhole mixing. Alternately and more preferably however, where the selected curing agent is an alkoxylated amine, the two components are premixed at a factory using one or more of the preferred aromatic hydrocarbon dispersants and are injected as a complete system in this fashion. In this case, the combined system should be used within about three days after preparation so as to avoid significant premature curing in the container.

The coating systems of the invention can be injected by any convenient means into a production well. Normally, this involves injection of the two components of the system into the well casing (either mixed on-site or previously) without stopping the production of the well. Thereafter, the system is flushed using formation water for a sufficient period to insure that the system coats the appropriate downhole metallic surfaces. The time of formation water flushing can be estimated by a preliminary test involving injection of a dye into circulating well fluid an noting the time between injection and appearance of the dye at the well head. Use of the anti-corrosive systems of the invention results in coating of the well casing, sucker rods, pump rods and other associated equipment surfaces. When using the preferred system of the invention, it has been found that an effective corrosion-inhibiting film is deposited which has a useful life of several weeks.

By way of specific example, an oil well producing 58,800 gallons of total fluid per week would be treated by injection of a total of about 1.2 gallons of the preferred two-component coating system of the invention. This has been found to give a very effective corrosion resistant film on downhole well surfaces which lasts 3–4 weeks.

EXAMPLE

In this series of tests, corrosion inhibition compositions were prepared containing epoxy resin (EPON 828, Shell Chemical Company) and different curing agents, namely tallow 1,3-propylene diamine (Adogen 570S, CAS #61791-55-7), ethoxylated tallow 1,3-propylene diamine containing about 3 moles of ethylene oxide per mole of tallow diamine (Varonic T-403), ethoxylated tallow 1,3-propylene diamine containing about 10 moles of ethylene oxide per mole of tallow diamine (Pluradyne CI 1010, BASF Corporation) and imidazoline (Witcamine 209, CAS #68442-97-7).

In the first step, dilutions of the curing agents and epoxy resins were made. Specifically, for each curing agent and for the epoxy, dilutions containing 20%, 25%, 33%, and 50% by volume of the curing agent and epoxy were prepared using three solvents for each such dilution, namely xylene, toluene and heavy aromatic naphtha.

In the next step, 5 ml of each of the foregoing curing agent dilutions were added to 5 ml of each of the epoxy dilutions followed by mixing. Thereafter, 40 ml of formation water containing approximately 20,000 ppm chloride ion, 100 ppm hydrogen sulfide and some iron sulfide was added to each epoxy/curing agent mixture. These mixtures were allowed to stand in ambient air for a period of days. The control mixtures containing non-ethoxylated tallow diamine all exhibited significant degrees of agglomeration owing to the presence of the salts in the formation water. However, the mixtures containing the ethoxylated tallow diamines and imidazoline curing agents exhibited no significant agglomeration. It was determined that the mixtures containing the ethoxylated tallow diamines were superior.

In the next test, the respective mixtures were subjected to a freezing test by immersion of the test bottles in a mixture of dry ice and acetone to achieve temperatures on the order of −40° F. The mixtures containing the ethoxylated tallow diamines and imidazoline did not freeze.

I claim:

1. An anti-corrosion coating system comprising:

an epoxy resin in a first aromatic hydrocarbon dispersant; and a curing agent for the epoxy resin in a second aromatic hydrocarbon dispersant and selected from the group consisting of the alkoxylated amines and the imidazolines and mixtures thereof, said resin and curing agent when mixed together reacting to give a corrosion-resistant coating for metal surfaces.

2. The system of claim 1, said curing agent being an alkoxylated tallow amine having from about 2–15 moles of alkoxylate per mole of tallow amine.

3. The system of claim 2, said curing agent having from about 3–10 moles of alkoxylate per mole of tallow amine.

4. The system of claim 2, said curing agent being an ethoxylated tallow amine.

5. The system of claim 2, said curing agent being an alkoxylated tallow diamine.

6. The system of claim 1, the ratio of said curing agent to said epoxy being from about 1–4 parts by weight curing agent for each part by weight epoxy.

7. The system of claim 1, said curing agent being an alkoxylated amine, said epoxy resin and curing agent being mixed together.

8. The system of claim 1, said epoxy being present at a level of from about 10–50% by volume in said first dispersant.

9. The system of claim 1, said curing agent being present at a level of from about 10–50% by volume in said second dispersant.

10. The system of claim 1, said first and second dispersants being identical.

11. The system of claim 1, said system being essentially free of alcohol.

12. The system of claim 1, said first and second dispersants being respectively selected from the group consisting of benzene, xylene, toluene and heavy aromatic naphtha and mixtures thereof.

13. A premixed anti-corrosion system comprising an epoxy resin and an alkoxylated amine curing agent in an aromatic hydrocarbon dispersant.

14. The system of claim 13, said dispersant being selected from the group consisting of benzene, xylene, toluene, heavy aromatic naphtha and mixtures thereof.

15. The system of claim 13, each of said epoxy resin and curing agent being present at a level of from about 10–50% by volume in said dispersant.

16. The system of claim 13, said curing agent being an alkoxylated tallow amine having from about 2–15 moles of alkoxylate per mole of tallow amine.

17. The system of claim 13, said system being essentially free of alcohol.

* * * * *